(12) United States Patent
Amir

(10) Patent No.: US 11,014,818 B2
(45) Date of Patent: May 25, 2021

(54) PROCESS FOR PRODUCING GRAPHENE OXIDE PRODUCTS AND USES THEREOF

(71) Applicant: SHENKAR COLLEGE OF ENGINEERING AND DESIGN, Ramat Gan (IL)

(72) Inventor: Elizabeth Amir, Tel Aviv (IL)

(73) Assignee: SHENKAR COLLEGE OF ENGINEERING AND DESIGN, Ramat Gan (IL)

( * ) Notice: Subject to any disclaimer, the term of this patent is extended or adjusted under 35 U.S.C. 154(b) by 313 days.

(21) Appl. No.: 16/093,767

(22) PCT Filed: Apr. 9, 2017

(86) PCT No.: PCT/IL2017/050434
§ 371 (c)(1),
(2) Date: Oct. 15, 2018

(87) PCT Pub. No.: WO2017/179047
PCT Pub. Date: Oct. 19, 2017

(65) Prior Publication Data
US 2019/0127224 A1    May 2, 2019

Related U.S. Application Data

(60) Provisional application No. 62/322,253, filed on Apr. 14, 2016.

(51) Int. Cl.
*C01B 32/198* (2017.01)
*C01B 32/192* (2017.01)
(Continued)

(52) U.S. Cl.
CPC .......... *C01B 32/198* (2017.08); *C01B 32/182* (2017.08); *C01B 32/184* (2017.08);
(Continued)

(58) Field of Classification Search
CPC ... C01B 32/198; C01B 32/192; C01B 32/182; C01B 32/23; C01B 32/184;
(Continued)

(56) References Cited

U.S. PATENT DOCUMENTS

| | | |
|---|---|---|
| 2012/0129736 A1 | 5/2012 | Tour et al. |
| 2014/0299512 A1 | 10/2014 | Gargano et al. |
| 2015/0217538 A1 | 8/2015 | Zhamu et al. |

FOREIGN PATENT DOCUMENTS

| | | |
|---|---|---|
| WO | 2009/030928 A2 | 3/2009 |
| WO | 2014/134663 A1 | 9/2014 |

OTHER PUBLICATIONS

Compton, et al., Graphene oxide, Highly Reduced Graphene Oxide, and Graphene: Versatile Building Blocks for Carbon-Based Materials, Small 2010; 6(6): 711-723 (Year: 2010).*

(Continued)

*Primary Examiner* — Daniel C. McCracken
(74) *Attorney, Agent, or Firm* — Vorys, Sater, Seymour and Pease LLP; Anthony Venturino

(57) ABSTRACT

Provided is a process for producing graphene oxide (GO) product including forming a reaction mixture including graphite-based precursor and an oxidizing effective amount of an oxygenation agent including a complex of hypofluorous acid (HOF) and an organic solvent (HOF.organic solvent) and mixing the reaction mixture for a time sufficient to cause oxidation of the graphite based precursor. Further provided are products including the GO obtainable by the process or graphene products obtainable therefrom, as well as articles of manufacture including the same.

17 Claims, 1 Drawing Sheet

(51) Int. Cl.
    *C01B 32/182*     (2017.01)
    *C01B 32/23*     (2017.01)
    *C01B 32/184*     (2017.01)
    *B82Y 30/00*     (2011.01)
    *B82Y 40/00*     (2011.01)

(52) U.S. Cl.
    CPC ............ *C01B 32/192* (2017.08); *C01B 32/23* (2017.08); *B82Y 30/00* (2013.01); *B82Y 40/00* (2013.01)

(58) Field of Classification Search
    CPC ............ C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; B82Y 30/00; B82Y 40/00
    See application file for complete search history.

(56) References Cited

OTHER PUBLICATIONS

Hummers, Jr., et al., "Preparation of graphitic oxide", Journal of the American Chemistry Society, (1958), vol. 80, No. 6, p. 1339.

Rozen, "HOF-CH3CN: Probably the Best Oxygen Transfer Agent Organic Chemistry Has to Offer", ACS Publications, (2014), vol. 47, pp. 2378-2389.

* cited by examiner

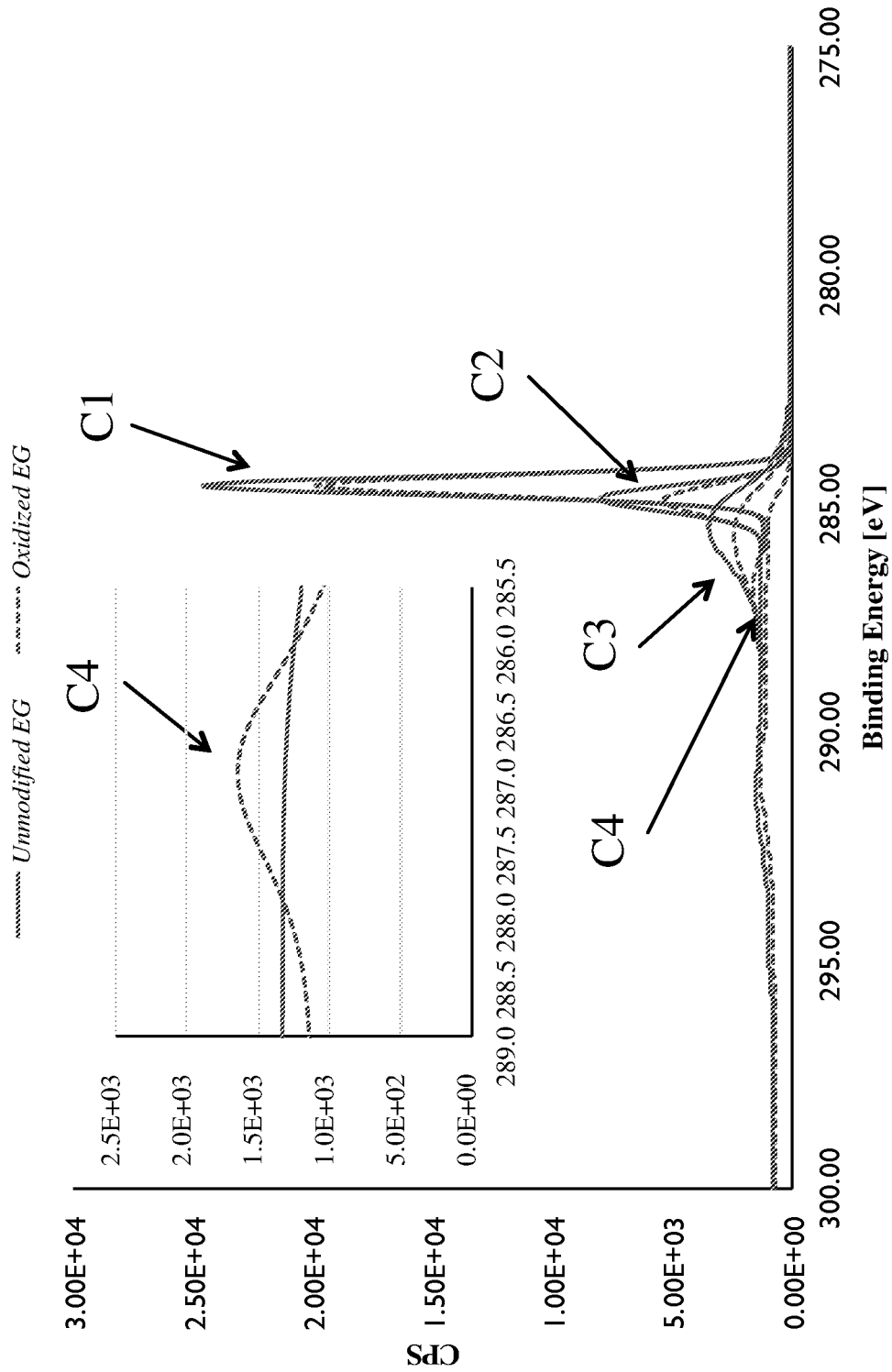

PROCESS FOR PRODUCING GRAPHENE OXIDE PRODUCTS AND USES THEREOF

TECHNOLOGICAL FIELD

The present disclosure is in the nanotechnology filed and relates to graphite or graphene related products.

BACKGROUND ART

References considered to be relevant as background to the presently disclosed subject matter are listed below:
- Hummers W. S. Jr. and Offeman R E "*Preparation of graphitic oxide*" Journal of the American Chemistry Society 80(6):1339 (1958)
- Shlomo Rosen, "*HOF.CH$_3$CN: Probably the Best Oxygen Transfer Agent Organic Chemistry Has to Offer*" Chem. Res., 47:2378-2389 (2014).
- International Patent Application Publication No. WO2009/030928

Acknowledgement of the above references herein is not to be inferred as meaning that these are in any way relevant to the patentability of the presently disclosed subject matter.

BACKGROUND

There are several forms of graphite including graphene, graphene oxide (GO), graphene oxide nanosheets (GOn), nanostructure/nanosphere GO (nGO) and chemically converted graphene (CCG). While graphene represents single sheets of graphite, GO has oxygen and hydrogen atoms incorporated into the carbon backbone. Among nano-scale reinforcing fillers, graphene has attracted significant attention during the last decade. Graphene sheets can dramatically enhance the electrical, physical and mechanical properties of polymer nanocomposites at relatively low loadings. Graphene is a single atomic layer of $sp^2$ carbon atoms. Few- and single-layer transferable graphene nanosheets were first obtained by mechanical exfoliation ("Scotch-tape" method) of bulk graphite and by epitaxial chemical vapor deposition. Although those routes might be preferred for precise device assembly, they can be less effective for large-scale manufacturing. Chemical means are a practical approach to bulk-scale graphene materials. The primary obstacle to achieving individual or few-layer graphene is overcoming the enormous interlayer Van der Waals forces.

To date, chemical efforts at graphite exfoliation have been focused primarily on intercalation, chemical modification, thermal expansion, oxidation-reduction, the use of surfactants, or some combination thereof. The most common approach to graphite exfoliation is the use of strong oxidizing agents to yield GO, a nonconductive hydrophilic carbon material, followed by its chemical reduction.

Generally, GO prepared from flake graphite can be readily dispersed in water and has been used on a large scale for preparing large graphitic films, as a binder for carbon products, such as, for example, as a component of the cathode of lithium batteries, as well as for other applications, as further detailed below. Moreover, the hydrophilicity of GO allows it to be uniformly deposited onto substrates in the form of thin films. It is also often essential to transform GO back into a graphitic material, and to this end, either in thin films or in bulk, partial restoration of the graphitic structure can be accomplished by chemical reduction to chemically converted graphene (CCG).

Although the exact structure of GO is difficult to determine, for GO the previously contiguous aromatic lattice of graphene is interrupted by epoxides, alcohols, ketone carbonyls, and carboxylic groups. The disruption of the lattice is reflected in an increase in interlayer spacing from 0.335 nm for graphite to more than 0.625 nm for GO.

In 1958, Hummers [Hummers W. S. Jr. and Offeman R. E. "Preparation of graphitic oxide" Journal of the American Chemistry Society 80(6):1339 (1958)] reported the method most commonly used today: the graphite is oxidized by treatment with $KMnO_4$ and $NaNO_3$ in concentrated $H_2SO_4$. Notably, all three of these procedures involve the generation of the toxic gas(es) $NO_2$, $N_2O_4$, and/or $ClO_2$; the latter also being explosive.

WO2009/030928 describes a process for making HOF.RCN, and using it to oxidize organic substances. The process comprises passing diluted fluorine through a conduit and RCN in water through another conduit into a microreactor to form HOF.RCN and reacting this with an organic substrate.

GENERAL DESCRIPTION

The present disclosure provides, in the context of its first aspect, a process for producing graphene oxide (GO) product comprising forming a reaction mixture comprising graphite-based precursor and an oxidizing effective amount of an oxygenation agent comprising a complex of hypofluorous acid (HOF) and an organic solvent (HOF.organic solvent) and mixing the reaction mixture for a time sufficient to cause oxidation of said graphite based precursor.

In one embodiment within the context of its first aspect, there is provided a process for producing graphene oxide (GO) product comprising forming a reaction mixture comprising graphite-based precursor and an oxidizing effective amount of an oxygenation agent comprising a complex of hypofluorous acid (HOF) and an the organic solvent being an organic nitrile (HOF.organic nitrile) and mixing the reaction mixture for a time sufficient to cause oxidation of said graphite based precursor.

In one embodiment, the organic nitrile is acetonitrile and the complex has the formula $HOF.CH_3CN$.

Also provided by the present disclosure, in accordance with a second of its aspects, is a graphene oxide product obtainable or obtained by the process disclosed herein.

Yet, provided by a further aspect of the present disclosure is graphene obtainable or obtained from the graphene oxide disclosed herein.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1 is an XPS spectra of an expanded graphene oxide (EGO) produced in accordance with an embodiment of the present disclosure, including an enlarged view of C4 intensity XPS spectra.

DETAILED DESCRIPTION

Graphene oxide carries oxygen-containing functional groups, present in form of carboxyl, hydroxyl and epoxy groups and it can be produced through a process of oxidation of graphite. These oxygen-containing groups give hydrophilic characteristics to the GO layers, which lead to a better dispersion of GO in water and enable exfoliation of GO layers into individual GOn via sonication technique in water.

The methods available today for the oxidation of graphite into GO involve the use of strong and corrosive acids and oxidants, producing a large amount of byproducts including toxic gases. In addition, these methods are inefficient and time-consuming as they often require multiple synthetic and prolonged purification steps.

The present disclosure provides an improved technique for producing GO.

Specifically, and in accordance with a first of its aspects, the present disclosure provides a process for obtaining GO product forming a reaction mixture comprising graphite-based precursor and an oxidizing effective amount of a complex of hypofluorous acid (HOF) and an organic solvent (HOF.organic solvent) and mixing the reaction mixture for a time sufficient to cause oxidation of said graphite based precursor.

In the context of the present disclosure, the term "HOF.organic solvent complex" denotes a complex between the HOF and an organic solvent, selected to stabilize the HOF. The solvent is selected such that it forms hydrogen bonds with the hydrogen of the HOF, thereby stabilizing the latter.

In one embodiment, the solvent is dimethyl formamide (DMF) or functional derivative thereof capable of forming hydrogen bonds with HOF.

In one embodiment, the solvent is dimethylsulfoxide (DMSO) or functional derivative thereof capable of forming hydrogen bonds with HOF.

In one other embodiment, the solvent is an organic nitrile.

In the context of the present disclosure the term "organic nitrile" is to be understood as encompassing a molecule of formula R—CN, wherein R is an organic moiety. In some embodiments, R is selected from the group consisting of —$C_1$-$C_{10}$ alkyl, preferably $C_1$-$C_6$ alkyl, —$C_2$-$C_3$ alkenyl, —$CH_2NH_2$, —$C_5$-$C_6$ cycloalkyl, —$C_5$-$C_6$ aryl.

Examples of organic nitriles include, without being limited thereto, acetonitrile, acrylonitrile, cyclopentane carbonitrile, aminoacetonitrile, benzonitrile.

In one preferred embodiment, the organic nitrile is acetonitrile.

When the solvent is an organic nitrile, the term "HOF.organic nitrile complex" is to be understood as any non-covalently bond between hypofluorous acid and the organic nitrile.

In one preferred embodiment, the HOF.organic nitrile complex is a HOF.$CH_3CN$ complex.

In the following description, when referring to HOF.$CH_3CN$ complex, being a preferred, but not limiting embodiment, it is to be understood as referring to any other HOF.organic solvents complex being chemically functional as an electrophilic oxidant.

As used herein, the term "graphite-based precursor" is to be understood in its broadest meaning as encompassing any structure comprising one or more stacked layers, each layer being made up of carbon atoms linked together in a hexagonal lattice. In some embodiments, at least a portion of the carbon atoms within the hexagonal lattice are substituted with an oxygen containing functional group, for example, hydroxyl, carboxyl, carbonyl and epoxy groups.

In some embodiments, the graphite-based precursor is expanded (exfoliated) graphite.

In some other embodiments, the graphite-based precursor is graphite oxide.

In yet some other embodiments, the graphite-based precursor is an expanded graphite oxide.

The graphite-based precursor can be of natural source, e.g. the naturally occurring mineral also referred to as flake graphite, or synthetic graphite, such as that derived high temperature processes involving calcined petroleum coke and coal tar pitch.

In accordance with the present disclosure, the graphite-based precursor is reacted with HOF.$CH_3CN$ agent.

In the context of the present disclosure "oxygenation agent" encompasses the HOF.organic solvent complex, such as HOF.organic nitrile complex, or specifically, the HOF.$CH_3CN$ complex within a carrier.

HOF.$CH_3CN$ complex is a known powerful oxygenation reagent. As described by Prof. Shlomo Rozen [Shlomo Rozen (2014) ibid.] the complex HOF.$CH_3CN$ is readily obtained by bubbling nitrogen diluted fluorine into aqueous acetonitrile solution. It does not have to be purified or isolated, and its solution can react as is, after the concentration has been establish by any iodometric method.

In some embodiments, the HOF.organic solvent complex, such as the HOF.organic nitrile complex and specifically, the HOF.$CH_3CN$ complex is prepared by bubbling fluorine ($F_2$) diluted in nitrogen ($N_2$) through a solution of an organic nitrile, e.g. acetonitrile in water.

In some embodiments, the diluted fluorine comprises between 10%-20% v/v $F_2$ in $N_2$; at times, about 15%±2% v/v $F_2$ in $N_2$.

In some embodiments, when the organic solvent is acetonitrile, the mixture of water and acetonitrile is a solution comprises between 5% v/v to 25% v/v, at times, between 5% v/v to 15% v/v, and yet at times, about 10% v/v of acetonitrile in water.

The preparation of the complex, specifically the HOF.$CH_3CN$ complex is preferably under controlled temperature, preferably below 0° C. In some embodiments, the bubbling of the diluted fluorine into the organic nitrile, specifically, acetonitrile solution is at temperatures in the range of −30° C. to −10° C., preferably about −15° C.±−5° C.

Without being bound by theory it is suggested that while HOF molecule itself, is unstable at temperatures above −100° C., the acetonitrile forms a hydrogen bonding with it and makes it stable at room temperature for a sufficient time (few hours) to allow it to carry out oxygenated reactions.

HOF.$CH_3CN$ complex was described, inter alia, by Prof. Shlomo Rozen [Shlomo Rosen, (2014) ibid.] to effectively oxygenate types of double bonds, including tetrasubstituted ones, oxidize primary amines into the corresponding nitro compounds and tertiary amines into N-oxides, prepare oligo- and polythiophenes from their aromatic precursors and many more.

The concentration of the HOF.$CH_3CN$ complex in the oxygenation agent utilized in accordance with the present disclosure, namely, the oxygenation effective amount, may vary and will depend, inter alia, on degree of desired oxygenation. The concentration can be determined, for example, by adding potassium iodine (KI) to 1 ml solution of the oxygenation agent (that provided the desired degree of oxygenation) which will generate $I_2$ and $I_3^-$, these being then titrated with sodium thiosulfate solution (0.1M).

In the context of the present disclosure the concentration (oxidizing effective amount) is sufficient to at least cause effective oxidation of the graphite-based precursor. Effective oxidation can be determined by an increase in the percentage of oxygen containing groups in the treated graphite based precursor by at least 1%, at times, by at least 2%, by at least 5%, by at least 8%, by at least 10%, and even by at least 20% as compared to the percentage of said oxygen containing groups in the non-treated precursor (before being brought into contact with the agent).

In some embodiments, the increase in the percentage of oxygen containing groups in the treated graphite based precursor is by at most 40%, at times, by at most 50%.

In some embodiments, the oxidizing effective amount of the $HOF.CH_3CN$ complex in the oxygenation agent is at least 0.2M, at times, between 0.2 M to 1.0M, yet at times, between 0.2M to 0.6M, further at times, about 0.25M±0.1M.

It has been found that the use of $HOF.CH_3CN$ improved the oxidation of graphite-based precursors in various aspects. For example, the use of $HOF.CH_3CN$ complex eliminated the harsh reaction conditions and purification steps required when used Hummers methods (the original Hummers method as well as its improved or modified methods). In addition, the use of $HOF.CH_3CN$ complex allows to prepare graphene-oxide products with various degrees of oxygen-containing groups.

In addition, it has been found (not shown) that by the use of $HOF.CH_3CN$ and the reaction conditions disclosed herein it is possible to control the amount of oxidation as compared to the methods of the prior art where typically the same amount of oxidation, irrespective of the reaction conditions.

Further, it has been found that the method of the present disclosure allows the control of the type of oxygen containing groups, such as hydroxyls, carboxylic acids, epoxides and others, included in the resulting GO (or rGO) product.

The graphite-based precursor and an oxidizing effective amount of $HOF.CH_3CN$ agent are mixed for a time sufficient to cause oxidation of the graphite based precursor.

In some embodiments, the mixing of graphite-based precursor with $HOF.CH_3CN$ comprises stirring for several seconds (e.g. 10-60 seconds), at times for at least 1 minute, at times, for at least 1 hour, at times, for at least 2, 3, 4, or even 5 hours. In some embodiments, the mixing of graphite-based precursor with $HOF.CH_3CN$ comprises a batch process where, preferably, predetermined amounts of the $HOF.CH_3CN$ are added with stirring intervals between each added amount thereof.

In some embodiments, the mixing is at any temperature above the freezing temperature of the organic solvent.

In some embodiments, the mixing is at room temperature. Room temperature in the context of the present disclosure encompasses any temperature within the range of 20° C. to 30° C., at times, a temperature of 25° C.±5° C.

In yet some other embodiments, the mixing is at lower temperatures, yet, being above the freezing temperature of the organic solvent. In some embodiments, the mixing is at a temperature below 20° C., at times, below 10° C., at times, below 0° C. In some embodiments, the stirring is at a temperature between about −20° C. to about 0° C.

It is noted that during the oxygenation reaction samples of the reaction mixture can be taken so as to determine therefrom the amount of oxygenation agent remaining in the mixture (and from that the amount of already occurred oxygenation).

To terminate the oxidation reaction, the $HOF.CH_3CN$ agent is quenched. This can be achieved, for example, by diluting the reaction mixture with water or an aqueous base such that the concentration of the $HOF.CH_3CN$ complex is below its effective concentration, i.e. the minimal concentration required for effectively oxidizing the graphite based product. The quenching can be also done by adding aqueous sodium bicarbonate. The amount of the quenching agent (be it water or an aqueous base such as aqueous sodium bicarbonate) will typically be minimal, yet sufficient to decompose all HOF in the reaction mixture.

In some embodiments, quenching of the HOF.organic solvent complex, or specifically the $HOF.CH_3CN$ complex is obtained by diluting the reaction mixture with deionized (DI) water, tap water or with an aqueous base such as aqueous sodium bicarbonate.

Quenching can be determined by measuring pH of the aqueous solution. Complete quenching is determined when the pH of the aqueous solution is essentially neutral (~7.0).

Once the reaction is terminated, the quenched reaction mixture is purified by removing residual material, e.g. diluted HF and $CH_3CN$ or other residual material based on the type of solvent used (these being products of the decomposed agent) to obtain purified GO product. The removal of the residual material can be achieved by a variety of purification methods. In some embodiments, the purification is by repeated washings with water, followed by drying according to procedures acceptable in the art. In some other embodiments, the purification can be by repeated centrifugation and washing.

At times, the purified GO product is dried, e.g. under vacuum at room temperature. In some embodiments, the purified GO product is dried, e.g. under vacuum at elevated temperatures, i.e. above 25° C., at times, between 50° C. to 100° C.

The purity of the resulting GO product is high according to considerations commonly acceptable in the art and specifically in comparison to other known products. For example, by the process disclosed herein there is no residual sulfur and nitrogen species that need to be removed from the reaction product, at least in prior art processes. In some embodiments, the purity of the resulting product, without the need for long (hours) or complex purification steps (e.g. washing), is equal or above 90%, or equal or above 92%, or equal or above 95%, or equal or above 97%. In some embodiments, the purity is between 95% and 99%.

Typically, due to the simplicity of the process disclosed herein, where only a single reagent is used, the purity of the resulting GO product will be determined by the purity of the graphite-based precursor, i.e. if the graphite-based precursor used in the process has a purity of 95%, it is reasonable that the purity of the GO product will be essentially 95%.

A unique feature of the disclosed process is that it is conducted at atmospheric pressures, this, inter alia, rendering the process more suitable for large scale production (e.g. moving from 1 ton to 1000 ton).

Another unique feature of the process disclosed herein, is that it is reproducible, i.e. when using the same reaction conditions, the same GO product (according to at least one measurable parameter) is obtained from batch to batch.

Yet, another unique features of the process disclosed herein stems from the use of HOF in the oxygenation agent. Since HOF is prepared from water, it can also be a source for other oxygen isotopes such as $^{18}O$. For example, when the oxygenation agent is prepared from "heavy water"—$H_2^{18}O$, the $^{18}O$ atoms will be present in the oxygenated product—$G^{18}O$.

The purified GO can be used as is or it can be further processed by any processing technique acceptable in the field to obtain a GO product.

In the context of the present disclosure the term "GO product" encompasses graphene oxide per se, as well as any product of its physical and/or chemical processing where at least a portion of the oxygen containing groups are retained.

In some embodiments, the purified GO is subjected to expansion/exfoliation to provide graphene oxide nanosheets (GOn). This can be done, for example, by any one of sonication, ultra-sonication and microwave.

In some embodiments, the purified GO is subjected to chemical reduction. This can be done by exposing the GO to $NaBH_4$, ascorbic acid, and HI in an aqueous solution. Chemical reduction of GO can lead to the formation of reduced graphene oxide, (rGO, resembling graphene albeit including residual oxygen and other heteroatoms and/or graphene).

In some embodiments, the GO can be subjected to chemical modification with functional groups, e.g. to form a covalent bond with the functional group, to form a functionalized GO product.

Following the above, the present disclosure also provides a graphene oxide (GO) product, obtainable by the process disclosed herein or by any other process providing the GO product bearing characteristics of the GO product obtained by the present disclosure.

In the context of the present disclosure, when referring to a product "obtainable" by the process disclosed herein it is to be understood as a product that can also be obtained by other processes, yet has at least one characteristic of the direct product of the disclosed process.

The GO product can be characterized by any technique available and commonly used in the art. Without being limited thereto, the GO product can be characterized using transmission electron microscopy (TEM) and/or dynamic force microscopy (DFM), and/or scanning electron microscopy (SEM) and/or atomic force microscopy (AFM), conductive AFM, each being typically but not exclusively used for characterizing the microscopic morphologies of GO sheets; field emission scanning electron microscopy (FE-SEM) typically used for determining grain size and surface morphology of the GO; Furrier transform infrared spectroscopy (FT-IR) and/or X-ray diffraction (XRD), typically but not exclusively used for characterization of the structure of the GO sheets; UV spectrometer (UV-VIS) typically but not exclusively used for measuring optical absorption properties of the GO sheets; thermal gravimetric analyzer (TGA) typically but not exclusively used for measuring thermal stability of GO sheets; elemental analyzer (EA), e.g. X-ray photoelectron spectroscopy (XPS) for analyzing the elemental composition at the surface of the GO sheets, including C, H, and O) and/or energy dispersive X-ray (EDX) and/or Raman spectroscopy typically used for characterization of the carbon bonds.

The GO product obtained by the process disclosure herein is distinct from prior art GO's by at least one characteristic determined by at least one of the techniques described above.

In some embodiments, the GO product disclosed herein is distinct from prior art GO's by a greater % of oxygen atoms. This can be determined, for example, using XPS spectroscopy.

Further, in some embodiments, the GO product disclosed herein is distinct from prior art GO's by a greater degree of purity (or lower amount of impurities). This can be determined, for example, using XPS measurements and/or any elemental analysis instruments.

Further, in some embodiments, the GO product disclosed herein is distinct from prior art GO's by its oxygen content, i.e. the type of oxygen containing groups, such as hydroxyls, carboxylic acids, epoxides and others, being incorporated via the oxygenation with HOF. This can be determined, for example, using IR spectroscopy and/or NMR.

In some embodiments, the GO product disclosed herein is characterized by the presence of hydroxyl and/or epoxide groups. In some embodiments, the presence of hydroxyl and/or epoxide groups is in an amount that is higher to that of other oxygen containing moieties that may be present in the GO product or an amount expected to be present based on known GO products.

The GO disclosed herein can be used as is, for various applications in various arenas, including, without being limited thereto, electronics, energy storage, biomedical applications, and biosensors.

In the field of electronics, several electronic devices have been fabricated using GO as a starting material for at least one of the components. One such device is a graphene-based field effect transistor (GFET) utilizing rGO and employing the same as chemical sensors and biosensors. The GFETs can also use functionalized rGO in a semiconductor where the rGO is a biosensor for detecting hormonal catecholamine molecules, avidin, and DNA.

Further in the field of electronics, GO can be functionalized and deposited on an electrode for use as an electrochemical sensor. For example, GO can be functionalized with glucose oxidase, deposited on an electrode and used as an electrochemical glucose sensor.

Further in the field of electronics, rGO can be used as a transparent electrode.

In the field of energy storage, the rGO can be used for high capacity energy storage in lithium ion batteries. High surface area rGO can be useful as an energy storage material in supercapacitors.

In the field of biomedical applications, the GO can be used in various biomedical applications, e.g. as a component in drug delivery systems, in tissue engineering, as an agent for imaging, cancer therapies, cytotoxicity or as an antibacterial agent. Functionalized nanographene oxide (nGO, such as GO nanocolloids) can be used in targeted delivery, e.g. of anti-cancer drugs. Functionalization can be, for instance, with polyethylene glycol (PEG) as the linker for an active principle, such as, without being limited thereto, hyaluronic acid or doxorubicin hydrochloride.

In the field of biosensor, GO and rGO can be used as components in systems for detection of biologically relevant molecules. GO can be used as a fluorescence quenching material in biosensors, which utilize the fluorescence resonance energy transfer (FRET) effect. For example, single-stranded DNA (ssDNA) with a fluorescence tag can be linked non-covalently to GO with subsequent quenching of the fluorescence of the tag. Folic acid functionalized GO can be used as a component in a system used to detect cancer cells.

Further, GO can be used as ion exchange material. For example, sulfonic functionalized GO is used as ion-exchange material in electrochemiluminescence analysis systems.

In further embodiments, the GO can be used for creating membranes, e.g. for water treatment applications and filtering various ions and molecules.

Further, GO can be used as a thermal conductor, e.g. in thermal heat dissipation materials.

The GO can also be used as a coating agent, e.g. to protect against corrosion, or to limit UV radiation damages, heat dissipation coatings, coatings for a variety of medical devices etc.

Yet further, the GO can be combined in polymer solar cells and light emitting diodes.

In some further aspects of the present disclosure, the GO is used in a method of producing graphene products.

In some embodiments, the GO is subjected to a chemical reduction (deoxygenation) agent so as to remove oxygen atoms from the GO sheets.

In some embodiments, the GO is subjected to base washing, e.g. NaOH to remove oxygen atoms from the GO sheets.

In some other embodiments, the GO is subjected to treatment with hydrazine solution, e.g. hydrazine monohydrate solution to remove oxygen atoms from the GO sheets.

In some other embodiments, the GO is subjected to electrochemical reduction to remove oxygen atoms from the GO sheets.

In yet some other embodiments, the GO is subjected to refluxing to remove oxygen atoms from the GO sheets.

Depending on the (controllable) conditions, the above deoxygenation process provides either reduced GO (rGO) or a graphene product.

In some embodiments, the GO can be mixed with different polymers and other materials so as to obtain a composite material with enhanced properties (e.g. in reference to the mixture of materials in the absence of the GO), such as tensile strength, elasticity, quality of dispersion. In some embodiments, the GO can be used in solid form, e.g. in flakes attached one to another to form thin and stable flat structures that can be folded, wrinkled and/or stretched.

Thus, in the context disclosed herein, also provided are graphene products obtainable by a process of deoxygenation of the GO product disclosed herein. In some embodiments, the graphene product is obtained from the GO disclosed herein. Further, in some embodiments, the graphene obtainable from the GO disclosed herein is an expanded/exfoliated graphene.

Further in the context of the present disclosure there is also provided an article of manufacture comprising the GO product of graphene product disclosed herein. The article of manufacture can be any device for use as disclosed herein, such as a biosensor, a drug delivery device, an ion exchanger, membrane, filter, electrical conductor etc.

As used herein, the forms "a", "an" and "the" include singular as well as plural references unless the context clearly dictates otherwise.

Further, as used herein, the term "comprising" is intended to mean that the recited element, e.g. the oxygenation agent includes the recited complex, e.g. HOF.CH$_3$CN complex, but not excluding other components, such as carriers and excipients as well as other oxygenation agents. The term "consisting essentially of" is used to define that the recited element, e.g. the oxygenation agent includes the recited components but excludes other components that may have an essential significance on the production of the GO product. "Consisting of" shall thus mean excluding more than trace elements of other components. Embodiments defined by each of these transition terms are within the scope of this invention.

Further, all numerical values, e.g. when referring to amounts or ranges of components are approximations which are varied (+) or (−) by up to 20%, at times by up to 10% of from the stated values. It is to be understood, even if not always explicitly stated that all numerical designations are preceded by the term "about".

The invention will now be exemplified in the following description of experiments that were carried out in accordance with the invention. It is to be understood that these examples are intended to be in the nature of illustration rather than of limitation. Obviously, many modifications and variations of these examples are possible in light of the above teaching. It is therefore, to be understood that within the scope of the appended claims, the invention may be practiced otherwise, in a myriad of possible ways, than as specifically described herein below.

NON-LIMITING EXAMPLES

Materials

HOF.CH$_3$CN was prepared by Elizabeth Amir in the research lab of Prof. Shlomo Rozen, Tel Aviv University.

CH$_3$CN was obtained from Sigma-Aldrich company.

Graphite was obtained from Asbury carbons (grade 3772, density—2.26 gr/cm$^3$).

Methods

Oxygenation of Expanded Graphite (EG) using HOFCH$_3$CN Complex

HOF.CH$_3$CN was prepared by bubbling diluted fluorine (10-15% F$_2$ in N$_2$) through a mixture of water and acetonitrile at −15° C. for about 1 hour as previously described by Prof. Shlomo Rozen [Shlomo Rosen 2014, ibid.]. The resulting HOF.CH$_3$CN agent used at a final concentration of 0.25 M.

The agent was then introduced into a glass round bottom flask containing 100 mgr of expanded graphite in water. The solution was stirred at room temperature for 10 minutes, followed by dilution with water in order to quench HOF.CH$_3$CN. The EG-Oxide product was filtered and washed several times with deionized (DI) water in order to remove any residual materials.

Prior to the analysis, expanded GO (EGO) was dried in a vacuum oven at 60° C. over night. X-ray Photoelectron Spectroscopy (XPS) analysis was carried out in order to estimate the atomic composition on the surface of EG before and after the oxygenation with HOF.CH$_3$CN. Specifically, XPS spectra were recorded with Kratos Axis Ultra spectrometer (Kratos Analytical Ltd., Manchester, U.K.) using an Al Kα monochromatic radiation X-ray source (1486.7 eV). Data were collected and analyzed by using a Casa XPS (Casa Software Ltd.) and Vision data processing program (Kratos Analytical Ltd.). The high-resolution XPS spectra were collected with a takeoff angle of 90 deg. (normal to analyzer); vacuum condition in the chamber was 1.9×109 Torr, with pass energy of 20 and 0.1 eV step size. The binding energies were calibrated using C is peak energy as 285.0 eV.

Results

The oxygenation reaction, carried out at room temperature, was extremely fast (10 min.), and required a very simple purification technique using only water.

The results are presented in Table 1 and FIG. 1 and clearly show that while the surface of expanded graphite before the reaction with HOF.CH$_3$CN contains only C and H atoms with no detectable presence of oxygen atoms as expected, the product EGO contained 5% of oxygen atoms (shown also in the enlarged view of C4 intensity XPS spectra, forming part of FIG. 1).

TABLE 1

XPS data for unmodified EG and EGO

| Sample | Unmodified EG | Oxidized EG |
|---|---|---|
| C1 intensity (C—C) | 55.12 | 55.18 |
| C2 intensity (C—C) | 22.75 | 20.14 |
| C3 intensity (C—H) | 22.14 | 19.43 |
| C4 intensity (C—O) | 0 | 5.25 |
| O/C ratio | 0.03 | 0.07 |

The invention claimed is:

1. A process for producing graphene oxide (GO) product comprising forming a reaction mixture comprising a graphite-based precursor and an oxidizing effective amount of an oxygenation agent comprising a complex of hypofluorous acid (HOF) and an organic solvent and mixing the reaction mixture for a time sufficient to cause oxidation of said graphite based precursor.

2. The process of claim 1, wherein said graphite-based precursor is selected from the group consisting of graphite, expanded graphite, graphene, graphene nanosheets, carbon black, and graphite oxide.

3. The process of claim 1, wherein said mixing is at a temperature of between 20° C. to 30° C.

4. The process of claim 1, wherein said oxygenation agent comprises $HOF \cdot CH_3CN$ complex in water.

5. The process of claim 1, wherein said complex of HOF and the organic solvent is $HOF \cdot CH_3CN$ and said oxidizing effective amount thereof is between 0.2M to 1.0M.

6. The process of claim 1, wherein said organic solvent is an organic nitrile.

7. The process of claim 6, wherein said organic nitrile is a compound of formula R—CN, wherein R is an organic moiety selected from —$C_1$-$C_3$ alkyl, —$C_2$-$C_3$ alkenyl, —$CH_2NH_2$, —$C_5$-$C_6$ cycloalkyl, —$C_5$-$C_6$ aryl.

8. The process of claim 7, wherein said organic nitrile is acetonitrile and the complex has the formula $HOF \cdot CH_3CN$.

9. The process of claim 1, comprising preparing the complex of HOF and the organic solvent prior to mixing with a graphite based precursor, said preparing comprises bubbling diluted fluorine ($F_2$) in nitrogen ($N_2$) through a solution of said organic solvent in water.

10. The process of claim 9, wherein said diluted $F_2$ comprises between 10%-20% v/v $F_2$ in $N_2$.

11. The process of claim 9, comprising preparing a $HOF \cdot CH_3CN$ complex prior to mixing with the graphite-based precursor, said preparing comprises bubbling diluted fluorine ($F_2$) in nitrogen ($N_2$) through a solution of acetonitrile in water.

12. The process of claim 11, wherein said solution comprises 10% v/v of acetonitrile in water.

13. The process of claim 1, comprising quenching said complex of the HOF and the organic solvent to obtain a quenched reaction mixture comprising graphene oxide, wherein said quenching is by diluting the reaction mixture with water or with an aqueous base.

14. The process of claim 13, comprising removing residual material from the quenched reaction mixture to obtain purified GO.

15. The process of claim 14, comprising filtering and washing of the quenched reaction mixture.

16. The process of claim 15, comprising processing the GO into a GO product.

17. The process of claim 16, wherein said GO product is a functionalized GO or a reduced GO.

* * * * *